Figure 10:
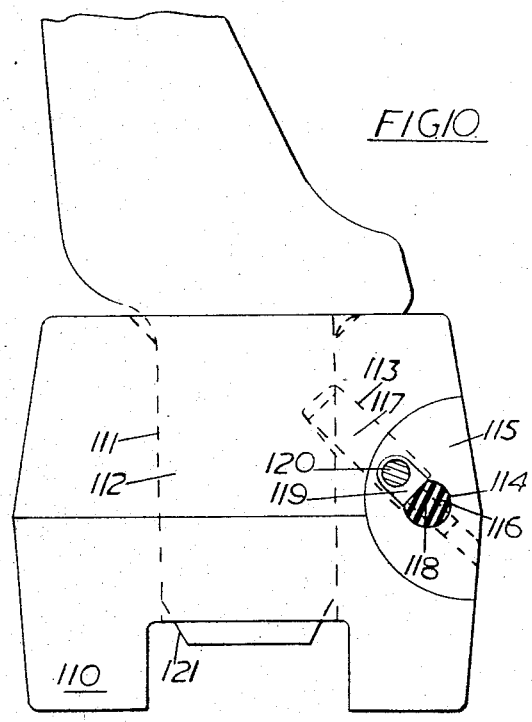

Jan. 10, 1967  S. E. PROCTOR  3,297,365
COAL CUTTER PICKS AND PICK BOXES THEREFOR
Filed July 6, 1965  6 Sheets-Sheet 1
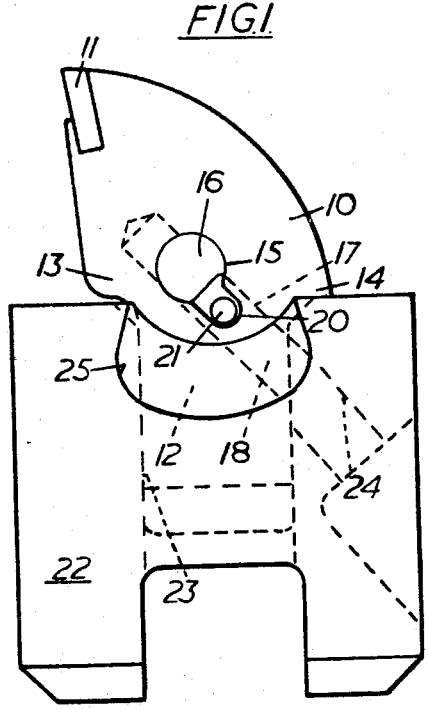
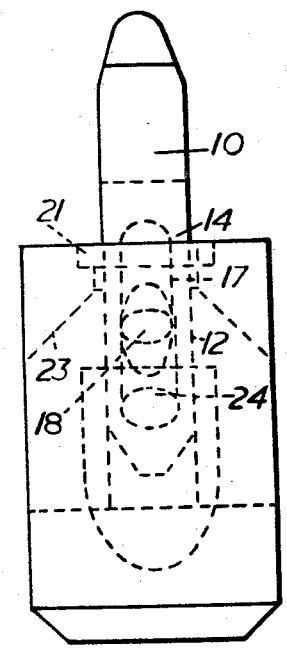
Inventor
Sidney E. Proctor
By,
Stevens, Davis, Miller & Mosher Attorneys Jan. 10, 1967    S. E. PROCTOR    3,297,365
COAL CUTTER PICKS AND PICK BOXES THEREFOR
Filed July 6, 1965    6 Sheets-Sheet 2
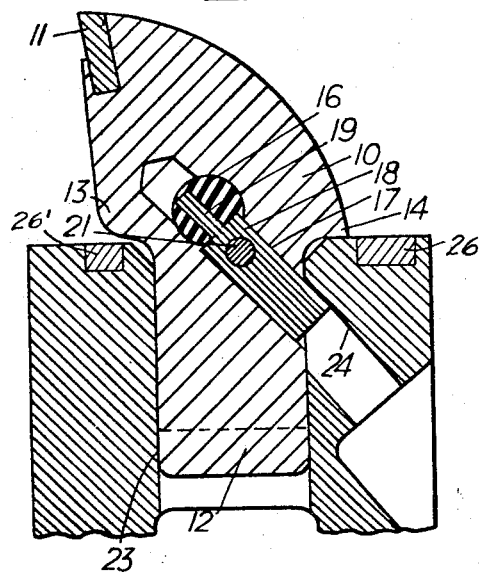
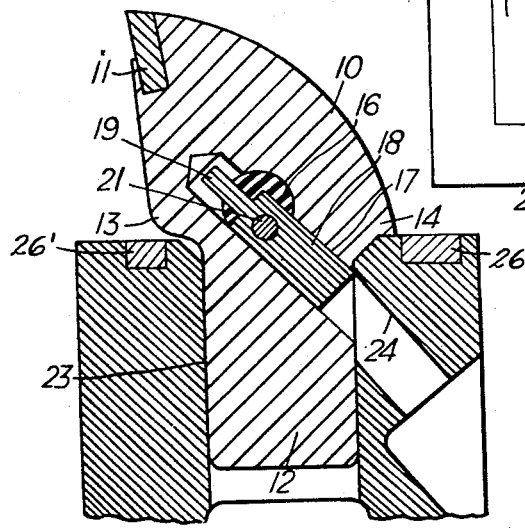
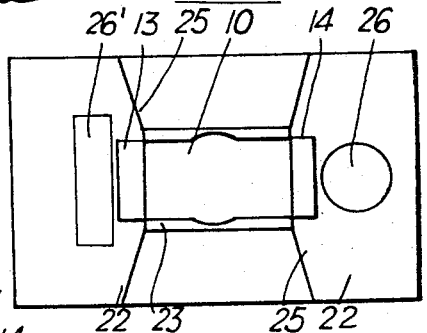
Inventor
Sidney E. Proctor
By
Stevens, Davis, Miller & Mosher    Attorneys

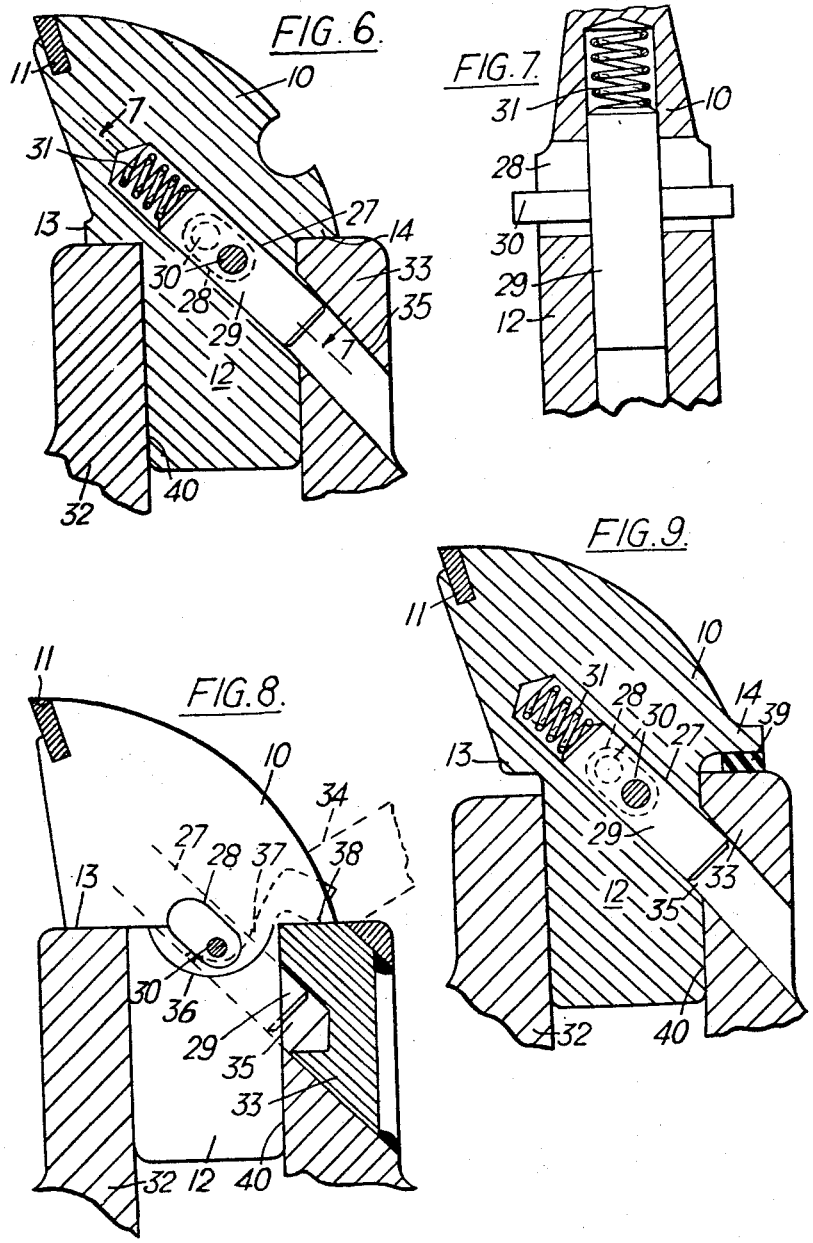

Jan. 10, 1967  S. E. PROCTOR  3,297,365
COAL CUTTER PICKS AND PICK BOXES THEREFOR
Filed July 6, 1965  6 Sheets-Sheet 4

Inventor
Sidney E. Proctor
By
Stevens, Davis, Miller & Mosher Attorneys

Jan. 10, 1967  S. E. PROCTOR  3,297,365
COAL CUTTER PICKS AND PICK BOXES THEREFOR
Filed July 6, 1965  6 Sheets-Sheet 5
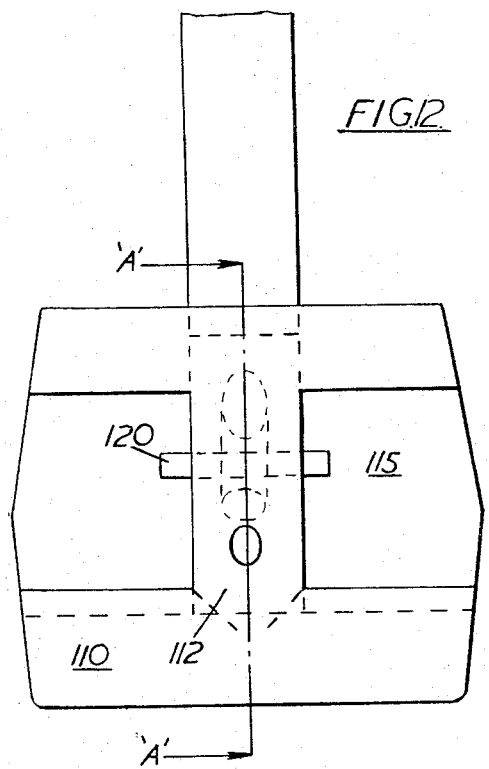
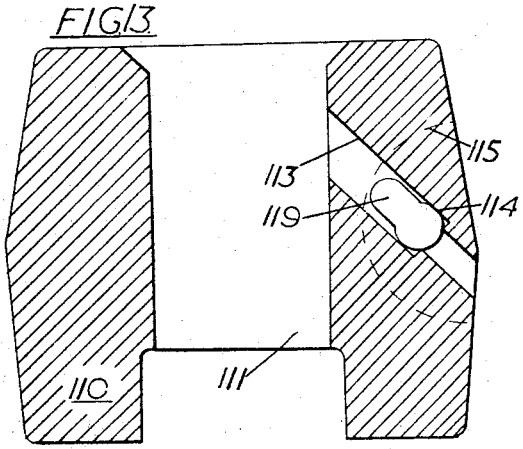
Inventor
Sidney E. Proctor
By
Stevens, Davis, Miller & Mosher Attorneys United States Patent Office 3,297,365
Patented Jan. 10, 1967

3,297,365
COAL CUTTER PICKS AND PICK
BOXES THEREFOR
Sidney E. Proctor, Saunderton, High Wycombe, England, assignor to Austin Hoy and Company Limited, High Wycombe, England, a British company
Filed July 6, 1965, Ser. No. 469,667
Claims priority, application Great Britain, July 28, 1961, 27,573/61; Dec. 8, 1961, 44,027/61; July 9, 1964, 28,376/64
12 Claims. (299—92)

This application is a continuation-in-part of my application, Serial No. 212,649 filed July 26, 1962, now abandoned.

This invention comprises improvements in or relating to coal cutter picks and pick boxes or blocks therefor. The pick boxes are linked together to form an endless coal cutter chain and the blocks may be attached to or form part of drums, discs, scrolls and other devices for cutting of coal and other minerals. For simplicity, a box or a block will be referred to hereinafter and in the claims simply as a box. From time to time, as the picks become worn with use, they must be released from their boxes and removed and replaced. Seeing that coal cutters work under exceptionally severe conditions in damp atmospheres heavily fouled with coal dust and other dirt, any release device to be truly practicable must be so devised that it retains its release qualities even when exposed surfaces are coated with dirt or even corroded.

An object of the invention is to provide a coal cutter pick with a release device by virtue of which the pick can be quickly and simply released from its box and will retain this quality until due for removal after a normal period of use.

According to one aspect of the invention there is provided in combination a cutter pick having a shank, a pick box having walls shaped to define a socket and engageable by said shank, at least one guideway, which guideway comprises a first bore in two sections, one section defined in said shank and the other section defined in one of said socket walls, the two sections registering when the shank is fully engaged between the socket walls, a latch housed in the guideway and guided for movement between a latched position at which the latch extends into both sections of said guideway and an unlatched position at which the latch is retracted into one section only of said guideway, a resilient member co-operating with the latch to urge the latch positively into the latched position, which resilient member is stressed when the latch is retracted to the unlatched position and is located in a second bore communicating with said first bore, and a part on the latch projecting through a channel from said guideway for forcible retraction of the latch to the unlatched position.

Said resilient member may comprise a solid resilient block which substantially fills said second bore.

The latch may have an axial projection of smaller diameter than that of the latch and passing through a passageway in the resilient member to locate the latch and the member relative to one another.

According to a further aspect of the invention there is provided a cutter pick having a shank engageable in the socket of a pick box, at least one guideway formed within said shank, a latch housed in the guideway and guided for sliding movement between a latched position at which the latch extends partly out from one end of said guideway to project from one face of the shank and an unlatched position at which the latch is retracted into the guideway, a receptacle in the pick communicating with said guideway and having a transverse access opening, a resilient member in said receptacle, said resilient member co-operating with the latch to urge the latch positively into its latched position and said member being stressed when the latch is retracted to the unlatched position, and a part on the latch projecting through a channel from said guideway for forcible retraction of the latch to the unlatched position.

Other features of the invention will be evident from the following description and claims.

Figure 11:
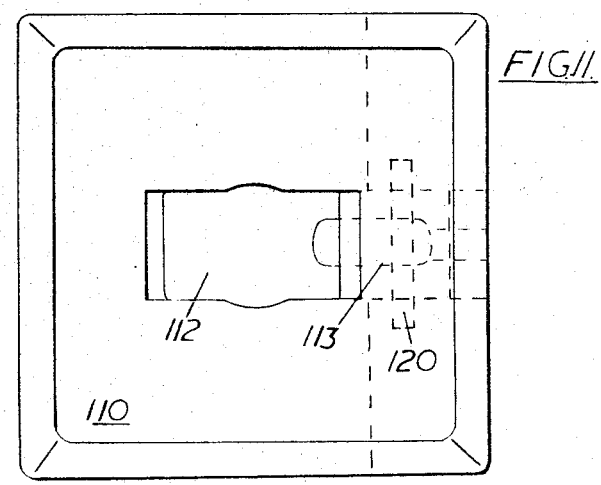
Figure 14:
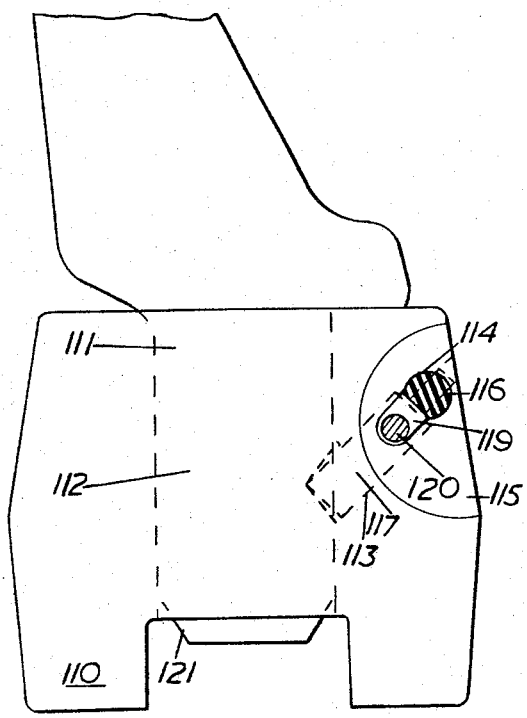

Four embodiments of combined cutter pick and box according to the invention are illustrated by way of example only in the accompanying drawings in which:

FIG. 1 is a side elevation of the first embodiment;
FIG. 2 is an end elevation;
FIGS. 3 and 4 are side elevations from the same viewpoint as FIG. 1 but in section to show a latch in the pick in two different positions relative to the box;
FIG. 5 is a plan view;
FIG. 6 is a side elevation in section of the second embodiment;
FIG. 7 is a section on the line 7—7 of FIG. 6;
FIG. 8 is a side elevation, partly in section, illustrating a tool for extracting the pick from the box;
FIG. 9 is a modification of the construction illustrated in FIG. 6;
FIG. 10 is a side elevation of the third embodiment;
FIG. 11 is a plan view;
FIG. 12 is an end elevation;
FIG. 13 is a section on the line A—A of FIG. 12;
FIG. 14 is a side elevation of the fourth embodiment.

Referring to FIGS. 1 to 9 in which like numerals denote like parts, the pick has a body 10 which may be of customary form, being recessed at its tip to receive a hard metal tip 11 and being formed with a rectangular section shank 12. For convenience of description it will be assumed that the shank 12 extends vertically downwards from the body 10. The body 10 has a pair of shoulders 13, 14 which merge into the shank 12.

Referring to FIGS. 1 to 4, immediately above shoulder level the body 10 is penetrated from front face to rear with a bore 15 serving as a receptacle for a solid cylindrical resilient block 16 of yielding rubber-like material, which is preferably or may necessarily be non-inflammable. The material known by the trade name "Neoprene" is suitable. The pick is also formed with an internal bore 17 which extends from the receptacle 15 at a downward inclination, say about 45° to the shank axis, and opens well below shoulder level through one side of the shank 12. This bore 17 serves as a guideway for a circular-section latch 18, which is a neat sliding fit in this guideway. The latch 18 is of a length such that, when the resilient block 16 is least compressed, one end portion of the latch 18 extends from the block through the side of the shank and projects therefrom. The other end of the latch 18 has an axial projection 19 of smaller diameter than that of the latch and passing through a hole in the block 16 to anchor the block in the bore 15. The pick is also formed, in its front and rear faces, with short slots 20 inclining downwards from the receptacle for the resilient block. These slots 20 serve as guides for and as access channels to a crosspiece 21 extending rigidly from the latch 18 and projecting beyond both front and rear faces of the pick just below shoulder level. The crosspiece 21 may be a steel tube which is split longitudinally and which is driven tightly through a cross-hole in the latch 18, the split ensuring that the crosspiece 21 will grip securely in the cross-hole.

The arrangement of the parts and formations described are such that if an upward force is applied to the crosspiece 21 (as shown in FIG. 4), the latch 18 will be retracted into its guideway 17 against the yielding resistance of the resilient block 16 which will be compressed or deformed.

The complementary pick box 22 may be of any generally customary form, adapted to be pivotally connected either directly or through links to other similar pick boxes, except that it has formations to suit the latch 18 and crosspiece 21. Accordingly, for the latch 18, a socket 23 in the box 22 which receives the shank has at least one side wall formed with a recess 24 with which the guideway opening 17 registers and into which the latch 18 normally projects (as shown in FIG. 3), thereby latching the pick securely in place. As will be seen from FIGS. 3 and 4, the angle of the recess 24 is approximately 40° to the axis of the shank, that of the guideway 17, is approximately 45° to the axis of the shank so that, when the latch 18 enters the recess 24, there will be a slight wedge effect and the pick will be firmly engaged with its seating. There may be a second similar recess in the opposite wall of the socket, thus allowing the miner to set the pick in either of two opposed positions; i.e. the pick is reversible. For the crosspiece 21, the top of the pick box 22 is formed with front and rear depressions 25 opening into the socket 23. The crosspiece 21 projects from the pick into these depressions 25.

Moreover, there is welded into the top of the pick box 22 at both sides of the socket 23 hard metal inserts 26 and 26' serving to prevent distortion of said top on account of thrust by the pick. The insert may also serve as an abuttment for an extraction tool, such as that described wih reference to FIG. 8.

Where the pick is to be fitted to the pick box 22, the shank 12 is entered as usual in the socket 23 and thereafter the pick is simply pressed home by hand. In the downward motion of the shank 12, the wall of the socket 23 deflects the projecting latch end but in the final position the latch 18 snaps into engagement with the recess 24. In order to remove the pick, the minor inserts the claw of a lever as hereinafter described underneath the crosspiece 21, places the heel on one of the hard abutments 26 and 26' and simply forces the pick upwards from the box. In this action, firstly the latch 18 is retracted into its guideway 17 against the yielding resistance of the resilient block 16 and secondly the shank 12 is slid from the socket 23.

A notable advantage of the release device is that the resilient block 16 fills the main opening in the faces of the pick, leaving only negligibly small crevices (namely small portions of the guides for the crosspiece). Thus, there is practically no room for damp coal dust and other dirt to accumulate and obstruct the eventual release action of the device. Moreover, there are no exposed metal surfaces which, if corroded, would hinder or prevent the release action.

In the embodiment described, the resilient block 16 is a solid body. It might instead be hollow, but even so its hollow interior if filled with dirt would not impede the release action. If desired, the resilient block might be reinforced by embedding in it a coil of spring metal.

In the example the shank and socket are rectangular in section, this form being preferred. Nevertheless they could instead be of circular, square, or any other cross section.

Referring to FIGS. 6 to 9, the shank 12 has a circular guideway 27 drilled into one side of the shank 12 at 45° to the axis of the shank upward into the pick. An elongated hole 28 through the pick forms a slit which communicates with and lies along the guideway 27.

A circular section latch 29 slides in the guideway 27 and has a crosspiece 30 projecting on both sides through the slit 28, so that the latch 29 can be moved by the crosspiece 30. A compression spring 31 in the guideway 27 abuts against the inner end of the guideway and against the latch 29 urging the latch outward from the guideway 27.

A pick box 32, in which the shank 12 is a sliding fit in a socket 40, has a hard metal insert 33 welded into a recess in the back wall of the socket 40. The insert 33 and recess are so shaped that the insert provides a hard abutment at the front edge of the rear wall for engagement of an extraction lever 34 (FIG. 8) as hereinafter described and also that there is a bridge piece of the pick box at the top back edge of the rear wall to facilitate and strengthen the location of the insert. The insert 33 has a circular recess 35 drilled in its inner face at such a depth in the pick box 32 as to receive the latch 29 when the shoulder 14 of the pick abuts on the top abutment of the pick box. The recess 35 in the pick box 32 is at 40° to the axis of the shank 12 so as to be almost in line with the latch 29. Thus the recess 35 receives the latch 29, by means of the force of the spring 31, with a wedging action. The side walls of the pick box 32 have semicircular portions 36 (FIG. 8) cut out to a depth below the lowest position of the crosspiece 30 to permit access of the lever 34.

The extraction lever 34 comprises a claw wrench to engage the crosspiece 30 from behind with hooked claws 37 which pass one each side of the pick and which pivots on the hardened insert 33. The underside of the lever near the root of the claws is so shaped that for initial movement a small hump 38 on the underside of the lever contacts the top face of the insert 33 and thereafter becomes the pivot.

In operation, the lever 34 is engaged under the crosspiece 30 and pulled backward and downward. Initially it pivots about the corner of the insert 33 and moves the latch 29 by the crosspiece 30 into the disengaged position. Further movement of the lever 34 frees the pick from the box 32 (in which it may be firmly wedged by coal dust or may be cemented in by corrosion) while the lever is still pivoted on the corner, the short-coupled lever enables a large force to be applied. Further movement of the lever engages the hump 38 of the lever on to the top of the insert 33, thus moving the pivot point and increasing the rate of extraction of the pick for a given lever movement once the pick has been freed.

Referring to FIG. 9, a rubber-like pad 39 is bonded to the underface of the shoulder 14 so that, when the pick is pressed down by cutting pressure, the pad 39 receives the initial shock load when the pick strikes a coal face and serves as a shock absorber, whereby to prolong the life of the pick and preventing deformation of the shoulders 13, 14 which would result in loosening of the pick in the box 32.

In either of the above embodiments the pick can be made reversible (for cutting in either direction) by having two latches engaging holes in the pick box, one at each side.

Referring now to FIGS. 10 to 13 in which like numerals denote like parts a pick box 110 is of any generally customary external form, adapted to be pivotally connected either directly or through links to other similar pick boxes. The box has a rectangular socket 111 for reception of the shank 112 of a cutter pick. One side wall of the socket has a guideway comprising a first bore 113 extending downwardly at an inclination, say about 45° to the inner face of said wall, from said inner face to the outer face of said wall. The shank 112 of the cutter pick has a recess with which the bore 113 registers when the shank is inserted into the socket. A second bore 114 transversely intersects the first bore and has an opening at each end into arcuate recesses 115 formed in the outer face of the associated side wall of the box.

Mounted in and substantially filling the receptacle in the transverse bore is a solid cylindrical resilient block 116 of yielding rubber-like material, which is preferably or may necessarily be non-inflammable.

A cylindrical latch 117 which is a neat sliding fit in the enlarged portion of the guideway bore leading from the inner face has at one end an axial projection 118 of smaller diameter than that of the latch and passing through a hole in the block 116 to locate the block in the transverse bore relative to the latch. The projection may extend through the block into the portion of the bore leading to the outer face. The latch 117 is of such a length that, when the block is least compressed, the other end of the latch projects from the bore into the socket.

Short slots 119 merge with the transverse bore and open into the recesses in the rear face of the side wall thereby serving as guides for and as an access channel to a pin 120 projecting laterally and rigidly from both sides of the latch.

In practice, when the shank 112 of a cutter pick is inserted into the socket in the box, the lower end 121 of the shank, which end is slightly tapered, presses the latch against the block 116 into the retracted position in the associated side wall and the shank is free to move downwardly in the socket until the shank is fully engaged in the box with the recess in the shank in register with the latch 117 which is then urged by the block into latching engagement with said recess. The cutter pick may be readily pressed by hand into locking engagement with the box.

In order to remove the pick, an extraction lever in the form of a claw wrench is positioned in the recesses with the claw of the lever engaged underneath the two ends of the pin 120. The lever is pivoted in the recesses to pull the pin against the resistance of the block to retract the latch out of engagement with the shank of the pick which is then simply lifted out of the box.

Referring now to FIG. 14 in which like numerals denote like parts from FIGS. 10 to 13 it will be seen that the construction is similar except that the guideway bore 113 extends upwardly at about 45° from the inner to the outer face. Consequently the recesses 115 are situated higher in the outer face.

In practice, before the shank of a cutter pick can be inserted into the box, the latch must be retracted. To retract the latch an extraction lever of the type described above is positioned with the claw of the lever engaged underneath the ends of the pin in the recesses. The lever is pivoted in the recesses and the latch thereby retracted. The cutter pick is then dropped into the socket and the latch allowed to return to its latched position under the resilient action of block 16.

Embodiments of the type described with reference to FIGS. 10 to 13 in which the guideway bore extends downwardly from the inner to the outer face have the advantage that the pick may be inserted without prior retraction of the latch by means of an extraction lever. Embodiments of the type described with reference to FIG. 14 having an upward bore require the latch to be retracted before the pick can be inserted, but on the other hand the pick is then held slightly more firmly in the pick box.

A notable advantage of the latch is that the block fills the receptable in the bore leaving only negligibly small crevices, such as parts of the guide slots for the cross-piece, for entry of damp coal dust and other dirt which might obstruct the release action of the latch.

I claim:

1. In combination a cutter pick having a shank, a pick box having walls shaped to define a socket and engageable by said shank, at least one guideway inclined to the axis of said shank, which guideway comprises a first bore in two sections, one section defined in said shank and the other section defined in one of said socket walls, the two sections registering when the shank is fully engaged between the socket walls, a latch housed in the guideway and guided for movement between a latched position at which the latch extends into both sections of said guideway and an unlatched position at which the latch is retracted into one section only of said guideway, a resilient member co-operating with the latch to urge the latch positively into the latched position, which resilient member is stressed when the latch is retracted to the unlatched position and is located in a second bore communicating with and transversely intersecting said first bore, a channel formed as an extension of said second bore extending in the direction of the axis of said latch and a part on the latch projecting through said channel from said guideway for forcible retraction of the latch to the unlatched position.

2. The combination as defined in claim 1 wherein said two sections of said first bore are inclined to said shank axis at different angles whereby in said latched position the latch exerts a wedge action urging the shank into the socket.

3. The combination as defined in claim 1 wherein said resilient member is a solid resilient block which substantially fills said second bore.

4. The combination as defined in claim 3 wherein the latch has an axial projection of smaller diameter than that of the latch, and the resilient block has a passageway therethrough, said axial projection sliding in said passageway to locate the latch and block relative to one another.

5. The combination as defined in claim 1 in which said latch is guided for movement between a latched position at which the latch extends into both sections of said guideway and an unlatched position at which the latch is retracted into the section of the guideway bore in the shank of the pick, and in which said second bore is situated in the shank of the pick.

6. The combination as defined in claim 1 in which said latch is guided for movement between a latched position at which the latch extends into both sections of said guideway and an unlatched position at which the latch is retracted into the section of the guideway bore in one of said pick box socket walls, and in which said second bore is situated in one of said pick box socket walls.

7. The combination as defined in claim 5 wherein the section of the guideway bore in the shank of the pick is formed at about 45° to the axis of the pick and the other section of the guideway bore is formed at about 40° to the axis of the pick, both sections sloping upwardly from the pick box into said pick shank.

8. A cutter pick having a shank engageable in the socket of a pick box, at least one guideway formed within said shank and inclined to the axis thereof, a latch housed in the guideway and guided for sliding movement between a latched position at which the latch extends partly out from one end of said guideway to project from one face of the shank, and an unlatched position at which the latch is retracted into the guideway, a receptacle in the pick communicating with said guideway and having a transverse access opening, a resilient member in said receptacle, said resilient member co-operating with the latch to urge the latch positively into its latched position and said member being stressed when the latch is retracted to the unlatched position, and a part on the latch projecting through said access opening for forcible retraction of the latch to the unlatched position.

9. A cutter pick as defined in claim 8 in which the resilient member comprises a resilient block substantially filling said receptacle.

10. A cutter pick as defined in claim 9 wherein said receptacle comprises a bore transversely intersecting said guideway and said access opening is in the form of a slot merging with said bore.

11. A pick box having walls shaped to define a socket engageable by the shank of a cutter pick, at least one of said walls having a guideway formed therein and inclined to the axis of said socket, a latch housed in the guideway and guided for sliding movement between a latched position at which the latch projects partly out from the end of said guideway into said socket for engagement in a complementary recess in said shank, and an unlatched position at which the latch is retracted into the guideway, a receptacle in the wall communicating with said guideway and having a transverse access opening, a resilient member in said receptacle, said resilient member co-operating with the latch to urge the latch into its latched position and said member being stressed when the latch is retracted to the unlatched position and a part on the latch projecting through said access opening from said guideway for forcible retraction of the latch to the unlatched positions.

12. A pick box as defined in claim 11 in which the resilient member is a resilient block substantially filling said receptacle.

References Cited by the Examiner

UNITED STATES PATENTS

| 1,864,466 | 6/1932 | Peterson | 287—119 |
| 2,190,081 | 2/1940 | Pfauser | 287—119 |
| 2,851,295 | 9/1958 | Chaffee | 287—119 |
| 3,021,124 | 2/1962 | Bowen | 299—92 X |
| 3,092,374 | 6/1963 | Krekeler | 299—92 |

FOREIGN PATENTS 549,892  12/1942  Great Britain.

ERNEST R. PURSER, *Primary Examiner.*

CHARLES E. O'CONNELL, *Examiner.*